United States Patent [19]

Bonissone et al.

[11] 4,404,160
[45] Sep. 13, 1983

[54] METHOD AND DEVICE FOR ELIMINATING THE FEEDER HEAD PORTION INJECTION MOULDING PROCESS

[75] Inventors: Giancarlo Bonissone; Piero Mulas, both of Genoa, Italy

[73] Assignee: F.I.P. Formatura Iniezione Polimeri S.p.A., Genoa, Italy

[21] Appl. No.: 248,224

[22] Filed: Mar. 27, 1981

[30] Foreign Application Priority Data

Apr. 15, 1980 [IT] Italy ............................ 12509 A/80

[51] Int. Cl.³ .............................................. B29F 1/05
[52] U.S. Cl. ................................. 264/328.9; 425/566
[58] Field of Search ............................. 425/566, 810; 264/328.9

[56] References Cited

U.S. PATENT DOCUMENTS

| | | | |
|---|---|---|---|
| 2,828,507 | 4/1958 | Strauss | 425/566 X |
| 2,878,515 | 3/1959 | Strauss | 425/566 X |
| 4,085,178 | 4/1978 | McNeely | 425/810 |
| 4,260,360 | 4/1981 | Holmes | 425/810 |
| 4,276,015 | 6/1981 | Rogers | 425/566 X |

Primary Examiner—Thomas P. Pavelko
Attorney, Agent, or Firm—Robert E. Burns; Emmanuel J. Lobato; Bruce L. Adams

[57] ABSTRACT

The present invention relates to a method and the relative device for the effecting thereof, for eliminating the feeder head portion which results at the end of the injection moulding process for articles of thermoplastic material.

4 Claims, 10 Drawing Figures

METHOD AND DEVICE FOR ELIMINATING THE FEEDER HEAD PORTION INJECTION MOULDING PROCESS

BACKGROUND OF THE INVENTION

It is well known that during the injection moulding of articles of thermoplastic material, it is necessary to provide a duct for feeding the molten material, which at the end of the injection operation remains partly attached to the article. This requires a subsequent finishing operation which obviously increases the cost of the product.

As the known system for dispensing with the finishing operation subsequent to the moulding are of necessity based on types of capillary injection (commonly known as submarine or tunnel injection), they lead to internal stresses in that zone of the article which is close to the point of injection. These stresses are extremely damaging to the physical-mechanical characteristics of the article.

OBJECT OF THE INVENTION

The object of the present invention is to obviate this drawback by means of a method, and the relative device for the effecting thereof, which enables the feeder head due to the material feed channel to be separated at the contour of the article, when said material which has just been injected is still in its pasty state and has not undergone the cooling process.

Such an effect is attained, according to the invention, by disposing among the various mould components an obturator for the material feed channel which closes said channel by being pushed into contact with the surface of the article.

The consequence is that on removing the article from the mould, it comprises no trace of a feeder head, and in particular the undesirable internal stresses which are generated with said types of capillary injection are not present.

DESCRIPTION OF A PREFERRED EMBODIMENT

In FIGS. 1 to 6 is shown an annular feed starting from a radial duct or an annular feed starting from a duct concentric with the mould. The invention can be advantageously applied in both these cases as will be illustrated hereinafter.

Figure 1:
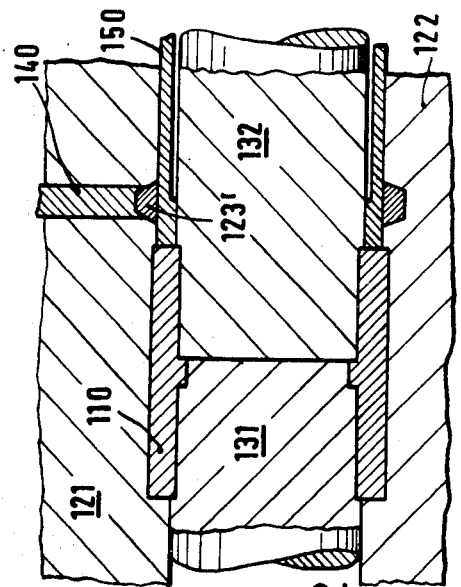
FIGS. 1, 2 and 3 relate to different moments during the operation of the obturator according to the invention, wherein the obturator in question is of annular form given that the feeder head is a feeder head of the ring type for the annular feed of the material under injection.
Figure 2:
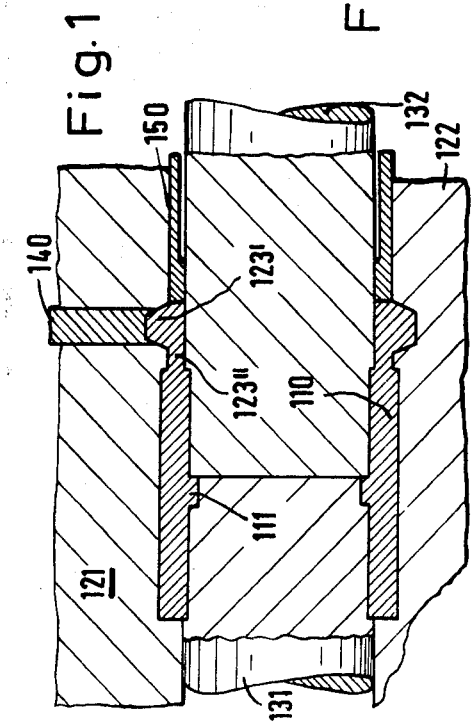
Figure 3:
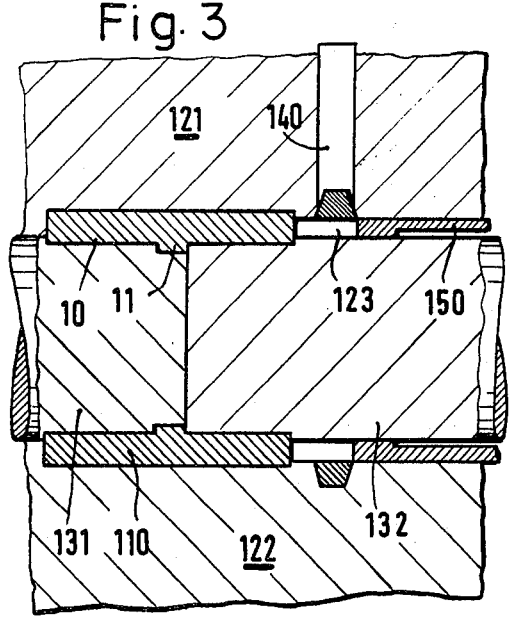

With particular reference to FIGS. 1 to 3, in this case the mould is constituted by two half moulds 121 and 122, and a pair of opposing pegs 131 and 132. The peg 131 has an annular step portion adjacent the peg 132 when the two mould halves are assembled. The piece to be moulded is a coupling 110 provided with an inner annular rib 111 disposed in a central position of the coupling 110 and formed by the annular step portion of the peg 131.

In this case a feed cavity 123 of annular shape is provided disposed externally to the mould cavity created by the mould elements 121, 122, 131, 132.

Said annular feed cavity 123 is connected to a duct 140, and is constituted by two equally annular parts, the first 123' having a trapezoidal cross-section and the second 123" having a rectangular cross-section. The first part 123' is connected to the feed channel 140, whereas the second part of the chamber 123" is closer to the cavity which forms the coupling 10.

The obturator 150 is in the form of a sleeve slidable between the half moulds 121 and 122 and the peg 132, and it has an inner diameter equal to the diameter of the peg 132 and an outer diameter equal to the outer diameter of the annular feed cavity 123".

The means for operating the obturator 150 are not shown here, as they can be constructed in any suitable manner.

Figure 5:
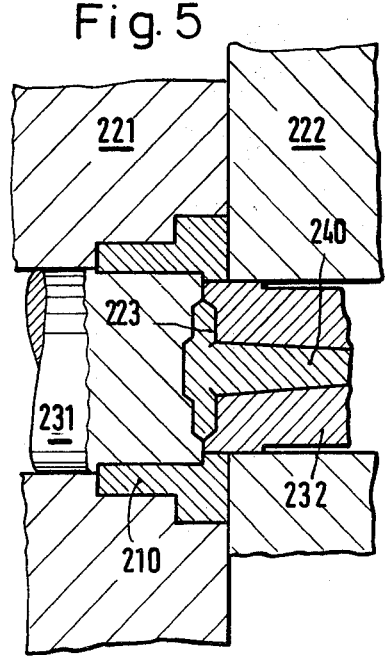

After filling the mould with the material in the fluid or pasty state through the duct 140 and the cavity 123 formed, as stated, by the two parts 123' and 123", the obturator 150 occupies the position shown in FIG. 5. After the mould has been filled, the obturator 150 commences its movement towards the left with reference to FIGS. 1 and 3, and, when in an intermediate position in the first part of the chamber 123, it intercepts the feed of the duct 140, whereas during the second part of its stroke it occupies the compartment defined by the second part 123" of the annular chamber 123, to compress the material contained therein into the mould.

Figure 6:
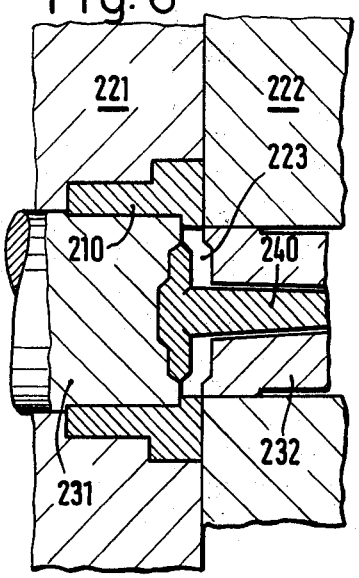
FIGS. 4, 5 and 6 are analogous to FIGS. 1 to 3, but in this case th obturator according to the invention is of cylindrical form, and is arranged to work in combination with a mould which comprises a membrane feeder head with annular feed of the material to be injected.
Figure 4:
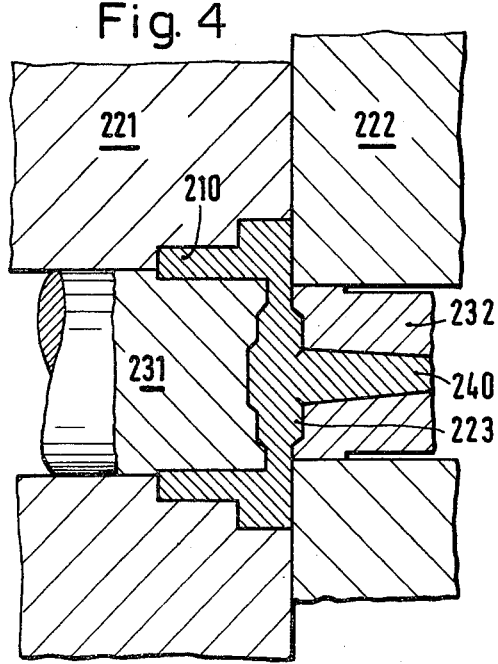

Subsequently, before stripping the mould, the obturator 150 is withdrawn to the position illustrated in FIG. 3. In FIGS. 4, 5 and 6, the article to be formed is again a coupling 210 of slightly different shape from that shown in the preceding figures. The basic mould elements 221, 222, 231, 232 are still present. However, in this case the feed duct 240 is provided inside the peg 232 which also performs the function of obturator, so reducing the number of component elements of the system by one.

It should also be noted that the pegs 231 and 232 are not in contact with each other, but define a flate space 223 into which the feed duct 240 opens.

When the filling of the mould is complete, as shown in FIG. 4, the peg 232 is made to approach the peg 231 as shown in FIG. 5, and this interrupts the feeder head formed by the material which has collected in the cavity 223.

When the peg 232 is withdrawn to its initial position as shown in FIG. 6, the piece 210 is ready for removal from the mould.

Although for descriptive reasons the present invention has been based by way of example on the embodiments heretofore described and illustrated with reference to the accompanying drawings, many modifications and variations can be made to the invention. These modifications and variations must however be considered as based on the claims which follow.

We claim:

1. A method for eliminating a circumferentially continuous feeder head portion which results at the end of the injection moulding of a tubular article of thermoplastic material, comprising filling a mould for forming the tubular article, and moving a movable obturator into a terminal portion of a thermoplastic material feed duct of the mould so as to block the feed duct, and further moving said obturator to compress the plastic material in the mould while maintaining the end of said obturator tangential to the surface of the tubular article which has just been formed.

2. A device for eliminating a circumferentially continuous feeder head portion at the end of the injection moulding of a tubular article of thermoplastic material, comprising: a mould body having a tubular cavity for forming a tubular article and a circumferentially continuous feed duct for injecting material into the tubular cavity; and at least one annular obturator movable between a rest position in which it leaves open the circumferentially continuous feed duct for the material being injected, and a working position in which it intercepts said feed duct and compresses the material injected into the tubular cavity; wherein said obturator is tangential to the cylindrical surface of the tubular article which is formed in the tubular cavity when said obturator is in the working position.

3. A device is claimed in claim 2, characterized in that the feed duct for the thermoplastic material is a duct terminating substantially in an annular cavity which surrounds the tubular article formed in said tubular cavity, said obturator comprises at least an active end portion constituted by a hollow cylinder which when in its working position separates the outer surface of the formed tubular article from the annular feed chamber for the thermoplastic material.

4. A device as claimed in claim 2, characterized in that the feed duct for the thermoplastic material is a duct terminating substantially in a flat cylindrical cavity or disc cavity circumferentially connected to the inner surface of the tubular article, said obturator is in the form of a cylinder which is inserted into said cavity to separate the inner surface of the tubular article formed in the tubular cavity from the material contained in the flat terminal cavity of the feed duct.

* * * * *